(12) United States Patent
Wong et al.

(10) Patent No.: US 6,888,977 B2
(45) Date of Patent: *May 3, 2005

(54) POLYMERIC LIQUID METAL OPTICAL SWITCH

(75) Inventors: Marvin Glenn Wong, Woodland Park, CO (US); Leslie A Field, Portola Valley, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 10/412,859

(22) Filed: Apr. 14, 2003

(65) Prior Publication Data

US 2004/0202404 A1 Oct. 14, 2004

(51) Int. Cl.[7] .............................. G02B 6/26; G02B 6/42
(52) U.S. Cl. .............................. 385/16; 385/15; 385/18
(58) Field of Search .............................. 385/15, 16, 18; 310/328; 200/182

(56) References Cited

U.S. PATENT DOCUMENTS

| 2,312,672 A | 3/1943 | Pollard, Jr. |
| 2,564,081 A | 8/1951 | Schilling |
| 3,430,020 A | 2/1969 | Von Tomkewitsch et al. |

(Continued)

FOREIGN PATENT DOCUMENTS

| EP | 0593836 A1 | 10/1992 |
| FR | 2418539 A | 9/1979 |
| FR | 2458138 A1 | 10/1980 |
| FR | 2667396 | 9/1990 |
| JP | SHO 36-18575 | 10/1961 |
| JP | SHO 47-21645 | 10/1972 |
| JP | 63-276838 | 5/1987 |
| JP | 01-294317 | 5/1988 |
| JP | 08-125487 A | 5/1996 |
| JP | 9161640 A | 6/1997 |
| WO | WO 99/46624 A1 | 9/1999 |

OTHER PUBLICATIONS

Jonathan Simon, "A Liquid–Filled Microrelay With A Moving Mercury Microdrop" (Sep. 1997) Journal of Microelectromechinical Systems, vol. 6, No. 3, PP 208–216.

Marvin Glenn Wong, "A Piezoelectrically Actuated Liquid Metal Switch", May 2, 2002, patent application (pending), 12 pages of specification, 5 pages of claims, 1 page of abstract, and 10 sheets of drawings (Fig. 1–10).

(Continued)

*Primary Examiner*—Frank G. Font
*Assistant Examiner*—Mary El-Shammaa (57) ABSTRACT

A polymeric optical switch in which a switching channel is formed in a polymer layer. The channel is formed by a micro-machining technique such as laser ablation or photo-imaging. A liquid metal switch is contained within the switching channel. The liquid metal switch operates by blocking or unblocking the optical path through the switching channel using a volume of liquid metal. Contact pads within the switching channel are wettable by the liquid metal and provide a latching mechanism for the switch. The polymer layer may be located between two transparent switch substrates. Solder rings are attached to the perimeters of the transparent switch substrates. The solder rings are wettable by solder and facilitate the creation of a hermetic seal between the substrates. Optical connectors allow optical signals to be coupled through the transparent layers and the switching channel.

34 Claims, 4 Drawing Sheets

U.S. PATENT DOCUMENTS

| | | |
|---|---|---|
| 3,529,268 A | 9/1970 | Rauterberg |
| 3,600,537 A | 8/1971 | Twyford |
| 3,639,165 A | 2/1972 | Rairden, III |
| 3,657,647 A | 4/1972 | Beusman et al. |
| 4,103,135 A | 7/1978 | Gomez et al. |
| 4,200,779 A | 4/1980 | Zakurdaev et al. |
| 4,238,748 A | 12/1980 | Goullin et al. |
| 4,245,886 A | 1/1981 | Kolodzey et al. |
| 4,336,570 A | 6/1982 | Brower |
| 4,419,650 A | 12/1983 | John |
| 4,434,337 A | 2/1984 | Becker |
| 4,475,033 A | 10/1984 | Willemsen et al. |
| 4,505,539 A | 3/1985 | Auracher et al. |
| 4,582,391 A | 4/1986 | Legrand |
| 4,628,161 A | 12/1986 | Thackrey |
| 4,652,710 A | 3/1987 | Karnowsky et al. |
| 4,657,339 A | 4/1987 | Fick |
| 4,742,263 A | 5/1988 | Harnden, Jr. et al. |
| 4,786,130 A | 11/1988 | Georgiou et al. |
| 4,797,519 A | 1/1989 | Elenbaas |
| 4,804,932 A | 2/1989 | Akanuma et al. |
| 4,988,157 A | 1/1991 | Jackel et al. |
| 5,278,012 A | 1/1994 | Yamanaka et al. |
| 5,415,026 A | 5/1995 | Ford |
| 5,502,781 A | 3/1996 | Li et al. |
| 5,619,600 A * | 4/1997 | Pohl ............................ 385/15 |
| 5,644,676 A | 7/1997 | Blomberg et al. |
| 5,675,310 A | 10/1997 | Wojnarowski et al. |
| 5,677,823 A | 10/1997 | Smith |
| 5,751,074 A | 5/1998 | Prior et al. |
| 5,751,552 A | 5/1998 | Scanlan et al. |
| 5,828,799 A | 10/1998 | Donald |
| 5,841,686 A | 11/1998 | Chu et al. |
| 5,849,623 A | 12/1998 | Wojnarowski et al. |
| 5,874,770 A | 2/1999 | Saia et al. |
| 5,875,531 A | 3/1999 | Nellissen et al. |
| 5,886,407 A | 3/1999 | Polese et al. |
| 5,889,325 A | 3/1999 | Uchida et al. |
| 5,912,606 A | 6/1999 | Nathanson et al. |
| 5,915,050 A | 6/1999 | Russell et al. |
| 5,972,737 A | 10/1999 | Polese et al. |
| 5,994,750 A | 11/1999 | Yagi |
| 6,021,048 A | 2/2000 | Smith |
| 6,180,873 B1 | 1/2001 | Bitko |
| 6,201,682 B1 | 3/2001 | Mooij et al. |
| 6,207,234 B1 | 3/2001 | Jiang |
| 6,212,308 B1 | 4/2001 | Donald |
| 6,225,133 B1 | 5/2001 | Yamamichi et al. |
| 6,278,541 B1 | 8/2001 | Baker |
| 6,304,450 B1 | 10/2001 | Dibene, II et al. |
| 6,320,994 B1 | 11/2001 | Donald et al. |
| 6,323,447 B1 | 11/2001 | Kondoh |
| 6,351,579 B1 | 2/2002 | Early et al. |
| 6,356,679 B1 | 3/2002 | Kapany |
| 6,373,356 B1 | 4/2002 | Gutierrez |
| 6,396,012 B1 | 5/2002 | Bloomfield |
| 6,396,371 B2 | 5/2002 | Streeter et al. |
| 6,408,112 B1 | 6/2002 | Bartels |
| 6,446,317 B1 | 9/2002 | Figueroa et al. |
| 6,453,086 B1 | 9/2002 | Tarazona |
| 6,470,106 B2 | 10/2002 | McClelland et al. |
| 6,487,333 B2 | 11/2002 | Fouquet et al. |
| 6,501,354 B1 | 12/2002 | Gutierrez et al. |
| 6,512,322 B1 | 1/2003 | Wong |
| 6,515,404 B1 | 2/2003 | Wong |
| 6,516,504 B2 | 2/2003 | Schaper |
| 6,559,420 B1 | 5/2003 | Zarev |
| 6,633,213 B1 | 10/2003 | Dove |
| 6,674,934 B2 * | 1/2004 | Carey et al. ................... 385/16 |
| 6,730,866 B1 * | 5/2004 | Wong et al. ................. 200/182 |
| 6,743,991 B1 * | 6/2004 | Wong et al. ................. 200/182 |
| 2002/0037128 A1 | 3/2002 | Burger et al. |
| 2002/0146197 A1 | 10/2002 | Yong |
| 2002/0150323 A1 | 10/2002 | Nishida et al. |
| 2002/0168133 A1 | 11/2002 | Saito |
| 2003/0035611 A1 | 2/2003 | Shi |
| 2003/0080650 A1 * | 5/2003 | Wong et al. ................. 310/328 |
| 2003/0086637 A1 * | 5/2003 | Carey et al. ................... 385/16 |

OTHER PUBLICATIONS

Bhedwar, Homi C. et al. "Ceramic Multilayer Package Fabrication." Electronic Materials Handbook, Nov. 1989, pp. 460–469, vol. 1 Packaging, Section 4: Packages.

"Integral Power Resistors for Aluminum Substrate." IBM Technical Disclosure Bulletin, Jun. 1984, US, Jun. 1, 1984, p. 827, vol. 27, No. 1B, TDB–ACC–NO: NB8406827, Cross Reference: 0018–8689–27–1B–827.

Kim, Joonwon et al., "A Micromechanical Switch with Electrostatically Driven Liquid–Metal Droplet." Sensors and Actuators, A: Physical. v 9798, Apr. 1, 2002, 4 pages.

* cited by examiner

POLYMERIC LIQUID METAL OPTICAL SWITCH

CROSS REFERENCE TO RELATED APPLICATIONS

This application is related to the following co-pending U.S. Patent Applications, being identified by the below enumerated identifiers and arranged in alphanumerical order, which have the same ownership as the present application and to that extent are related to the present application and which are hereby incorporated by reference:

Application 10010448-1, titled "Piezoelectrically Actuated Liquid Metal Switch", filed May 2, 2002 and identified by Ser. No. 10/137,691;

Application 10010529-1, "Bending Mode Latching Relay", and having the same filing date as the present application;

Application 10010531-1, "High Frequency Bending Mode Latching Relay", and having the same filing date as the present application;

Application 10010570-1, titled "Piezoelectrically Actuated Liquid Metal Switch", filed May 2, 2002 and identified by Ser. No. 10/142,076;

Application 10010571-1, "High-frequency, Liquid Metal, Latching Relay with Face Contact", and having the same filing date as the present application;

Application 10010572-1, "Liquid Metal, Latching Relay with Face Contact", and having the same filing date as the present application;

Application 10010573-1, "Insertion Type Liquid Metal Latching Relay", and having the same filing date as the present application;

Application 10010617-1, "High-frequency, Liquid Metal, Latching Relay Array", and having the same filing date as the present application;

Application 10010618-1, "Insertion Type Liquid Metal Latching Relay Array", and having the same filing date as the present application;

Application 10010634-1, "Liquid Metal Optical Relay", and having the same filing date as the present application;

Application 10010640-1, titled "A Longitudinal Piezoelectric Optical Latching Relay", filed Oct. 31, 2001 and identified by Ser. No. 09/999,590;

Application 10010643-1, "Shear Mode Liquid Metal Switch", and having the same filing date as the present application;

Application 10010644-1, "Bending Mode Liquid Metal Switch", and having the same filing date as the present application;

Application 10010656-1, titled "A Longitudinal Mode Optical Latching Relay", and having the same filing date as the present application;

Application 10010663-1, "Method and Structure for a Pusher-Mode Piezoelectrically Actuated Liquid Metal Switch", and having the same filing date as the present application;

Application 10010664-1, "Method and Structure for a Pusher-Mode Piezoelectrically Actuated Liquid Metal Optical Switch", and having the same filing date as the present application;

Application 10010790-1, titled "Switch and Production Thereof", filed Dec. 12, 2002 and identified by Ser. No. 10/317,597;

Application 10011055-1, "High Frequency Latching Relay with Bending Switch Bar", and having the same filing date as the present application;

Application 10011056-1, "Latching Relay with Switch Bar", and having the same filing date as the present application;

Application 10011064-1, "High Frequency Push-mode Latching Relay", and having the same filing date as the present application;

Application 10011065-1, "Push-mode Latching Relay", and having the same filing date as the present application;

Application 10011121-1, "Closed Loop Piezoelectric Pump", and having the same filing date as the present application;

Application 10011329-1, titled "Solid Slug Longitudinal Piezoelectric Latching Relay", filed May 2, 2002 and identified by Ser. No. 10/137,692;

Application 10011344-1, "Method and Structure for a Slug Pusher-Mode Piezoelectrically Actuated Liquid Metal Switch", and having the same filing date as the present application;

Application 10011345-1, "Method and Structure for a Slug Assisted Longitudinal Piezoelectrically Actuated Liquid Metal Optical Switch", and having the same filing date as the present application;

Application 10011397-1, "Method and Structure for a Slug Assisted Pusher-Mode Piezoelectrically Actuated Liquid Metal Optical Switch", and having the same filing date as the present application;

Application 10011398-1, "Polymeric Liquid Metal Switch", and having the same filing date as the present application;

Application 10011436-1, "Longitudinal Electromagnetic Latching Optical Relay", and having the same filing date as the present application;

Application 10011437-1, "Longitudinal Electromagnetic Latching Relay", and having the same filing date as the present application;

Application 10011458-1, "Damped Longitudinal Mode Optical Latching Relay", and having the same filing date as the present application;

Application 10011459-1, "Damped Longitudinal Mode Latching Relay", and having the same filing date as the present application;

Application 10020013-1, titled "Switch and Method for Producing the Same", filed Dec. 12, 2002 and identified by Ser. No. 10/317,963;

Application 10020027-1, titled "Piezoelectric Optical Relay", filed Mar. 28, 2002 and identified by Ser. No. 10/109,309;

Application 10020071-1, titled "Electrically Isolated Liquid Metal Micro-Switches for Integrally Shielded Microcircuits", filed Oct. 8, 2002 and identified by Ser. No. 10/266,872;

Application 10020073-1, titled "Piezoelectric Optical Demultiplexing Switch", filed Apr. 10, 2002 and identified by Ser. No. 10/119,503;

Application 10020162-1, titled "Volume Adjustment Apparatus and Method for Use", filed Dec. 12, 2002 and identified by Ser. No. 10/317,293;

Application 10020241-1, "Method and Apparatus for Maintaining a Liquid Metal Switch in a Ready-to-Switch Condition", and having the same filing date as the present application;

Application 10020242-1, titled "A Longitudinal Mode Solid Slug Optical Latching Relay", and having the same filing date as the present application;

Application 10020473-1, titled "Reflecting Wedge Optical Wavelength Multiplexer/Demultiplexer", and having the same filing date as the present application;

Application 10020540-1, "Method and Structure for a Solid Slug Caterpillar Piezoelectric Relay", and having the same filing date as the present application;

Application 10020541-1, titled "Method and Structure for a Solid Slug Caterpillar Piezoelectric Optical Relay", and having the same filing date as the present application;

Application 10030438-1, "Inserting-finger Liquid Metal Relay", and having the same filing date as the present application;

Application 10030440-1, "Wetting Finger Liquid Metal Latching Relay", and having the same filing date as the present application;

Application 10030521-1, "Pressure Actuated Optical Latching Relay", and having the same filing date as the present application;

Application 10030522-1, "Pressure Actuated Solid Slug Optical Latching Relay", and having the same filing date as the present application; and Application 10030546-1, "Method and Structure for a Slug Caterpillar Piezoelectric Reflective Optical Relay", and having the same filing date as the present application.

FIELD OF THE INVENTION

The invention relates to the field of microelectromechanical systems (MEMS) for optical switching, and in particular to a polymeric liquid metal optical switch.

BACKGROUND OF THE INVENTION

Liquid metal switches have been devised that use the heating of gases to create pressure changes that actuate the switches by creating gaps in liquid metal drops trapped in channels (to unblock optical paths) and moving the drops to wet between contacts (to block optical paths). A current method used to manufacture the channel structures has resolution and accuracy limits because it uses sandblasting to form the channels. In addition, the way the heater resistors are currently formed on the ceramic substrate causes energy inefficiencies from heat loss into the ceramic substrate.

SUMMARY

The present invention relates to a polymeric optical switch in which a switching channel is formed in a polymer layer. The channel may be formed by micro-machining techniques such as laser ablation or photo-imaging. A liquid metal switch is contained within the switching channel. The liquid metal switch operates by blocking or unblocking the optical path through the switching channel using a volume of liquid metal. Contact pads within the switching channel are wettable by the liquid metal and provide a latching mechanism for the switch. The polymer layer may be located between two transparent switch substrates.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

One aspect of the present invention is the use of micromachining techniques, such as laser ablation of polyimide or other polymeric films or layers, to create a channel structure in an optical liquid metal switch. This method achieves better tolerances and resolution than are achievable by sandblasting. In one embodiment, a channel layer is constructed out of Kapton (a sheet form of polyimide) or some other suitable polymeric film by laser ablating the necessary channel features into it. The channel layer is then adhered to the switch substrate using a suitable adhesive, such as Cytop or KJ (a thermoplastic polyimide with adhesive properties). Kapton is permeable to water vapor. If water vapor needs to be excluded from the resulting assembly, the assembly may be packaged for hermeticity, or it may be "self-packaged" by lamination to an impermeable support plate and sealed to the switch substrate using solder. The support plate may be made of metal, glass, silicon, or ceramic for example. The upper and lower support plates may be made of transparent materials, e.g. glass or quartz, to allow the transmission of optical signals through them.

In a further embodiment, the polymeric channel layer is made by coating a support plate with a suitable liquid polymer (such as a spin-on polyimide), curing it, and then creating the desired channel structure by laser ablation. Alternatively, if the material is photo-imageable, the channel structure may be made by exposing and developing the necessary features before the material is cured. The resulting channel layer may have a layer of adhesive deposited on it by spin coating or spray coating, for example, and then photo-imaged or laser ablated. Cytop could be processed by the former process; KJ could be processed by the latter.

It is also desirable to eliminate the loss of heat from the resistors into the substrate as much as possible. This can be done by creating pockets in the surface of the switch substrate and filling them with a low thermal conductivity polymer such as polyimide before the resistors are deposited. The drive signals to the resistors may be conducted by vias through the switch substrate or by traces on top of or running through the switch substrate, for example.

In a further embodiment, loss of heat from the resistors to the substrate is reduced by using a polymer, such as polyimide, with low thermal conductivity and resistance to high temperature for the switch substrate. The resistors may be deposited directly onto the polyimide or onto intermediate layers as desired. Thinning of the polyimide under and near the heater region can be used to reduce thermal conduction and thermal capacitance in the heater area. However, this approach has the disadvantage of needing a separate package if hermeticity is desired.

Figure 1:
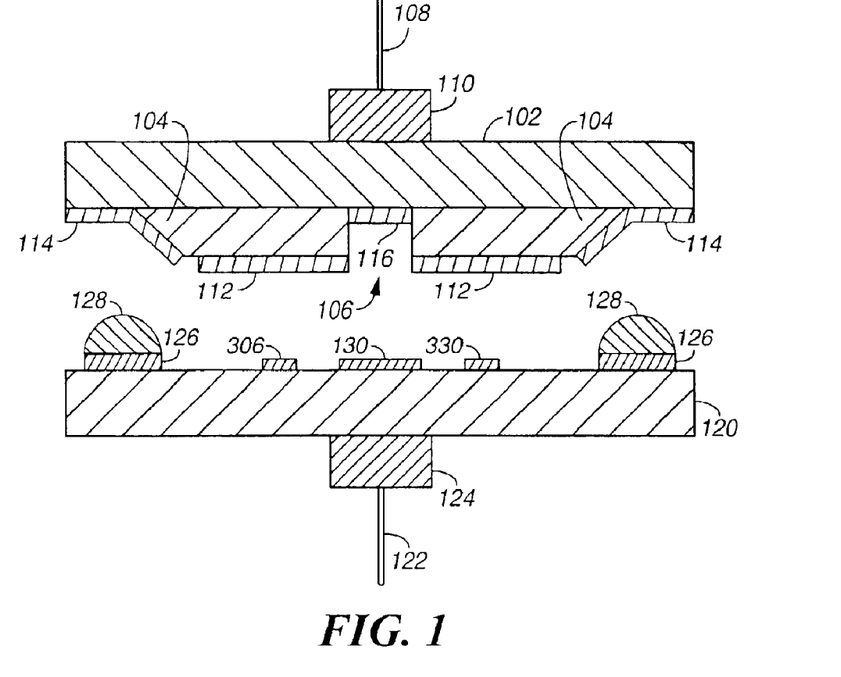
FIG. 1 is a sectional view of a self-packaged, polymeric liquid metal optical switch in accordance with certain embodiments of the present invention.

FIG. 1 shows a sectional view of a self-packaged, polymeric liquid metal optical switch of an embodiment of the present invention. The switch in FIG. 1 is shown in two parts before final assembly. The upper part includes a transparent channel support plate 102 covering a polymer layer 104. In other embodiments, opaque substrates containing waveguides may be used. The transparent channel support plate 102 may be made of glass or quartz, for example. The polymer may be polyimide, for example, which is an inert plastic, resistant to high temperatures. A switching channel 106 is formed in the polymer layer. An optical fiber 108 is coupled to the transparent channel support plate 102 by an optical connector 110. A layer of adhesive 112 covers the underside of the polymer layer 104. The adhesive may be Cytop or KJ, for example. Alternatively, the adhesive may be applied to the upper surface of the transparent switch substrate 120 of the lower part. In the preferred embodiment; the adhesive layer is approximately 7 microns thick. An upper solder ring 114 is attached to the perimeter of the underside of the transparent channel support plate 102 and the sides of the polymer layer 104. The upper solder ring is wettable by molten solder.

The lower part of the switch in FIG. 1 includes a transparent switch substrate 120. The substrate may be made of glass or quartz for example. An optical fiber 122 is coupled to the transparent switch substrate 120 by an optical connector 124. A lower solder ring 126 is attached to the perimeter of the inner surface of the transparent switch substrate 120. The upper solder ring is wettable by molten solder 128. Wettable contact pads, such as that shown as 130, are also formed on the inner surface of the transparent switch substrate 120 and aligns with the channel 106 in the upper part of the switch when the two parts are assembled. The wettable contact pad 130 is wettable by a liquid metal, such as mercury, which is used to provide a latching mechanism in the switch. In the preferred embodiment the contact is approximately 8000 Å thick. Electrical connectors 306 and 330 supply drive signals to heaters, which will be described below with reference to FIG. 3.

Figure 2:
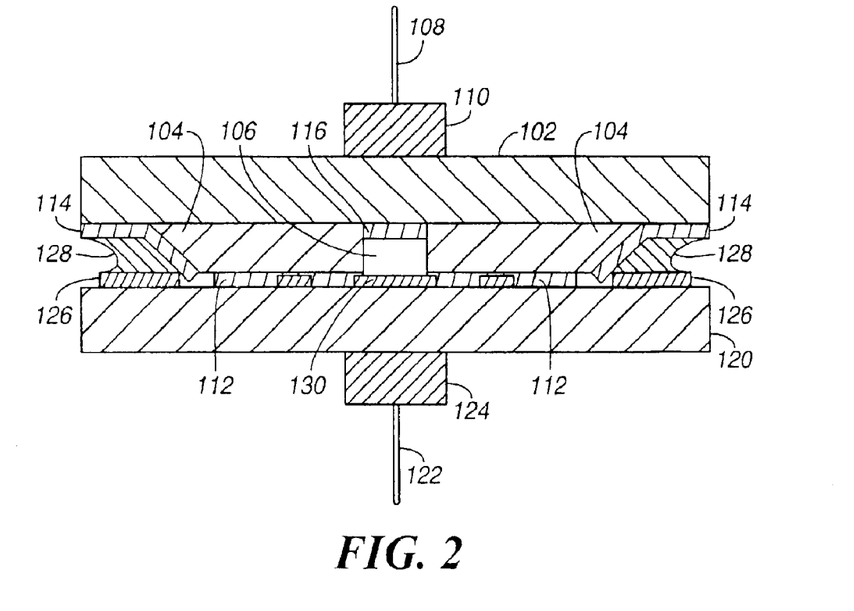
FIG. 2 shows a sectional view of an assembled switch in accordance with certain embodiments of the present invention.

FIG. 2 shows a sectional view of the assembled switch. The adhesive layer 112 bonds the polymer layer 104 to the transparent switch substrate 120 and creates a cavity 106 within the switch. The contact pad 130 is positioned on one side of the cavity 106. The solder 128 is drawn by surface tension to fill the gap between the upper solder ring 114 and the lower solder ring 126. This provides a reliable hermetic seal for the interior of the switch. Provided there is sufficient solder, the wettable solder rings guarantee that the seal will be complete.

Figure 3:
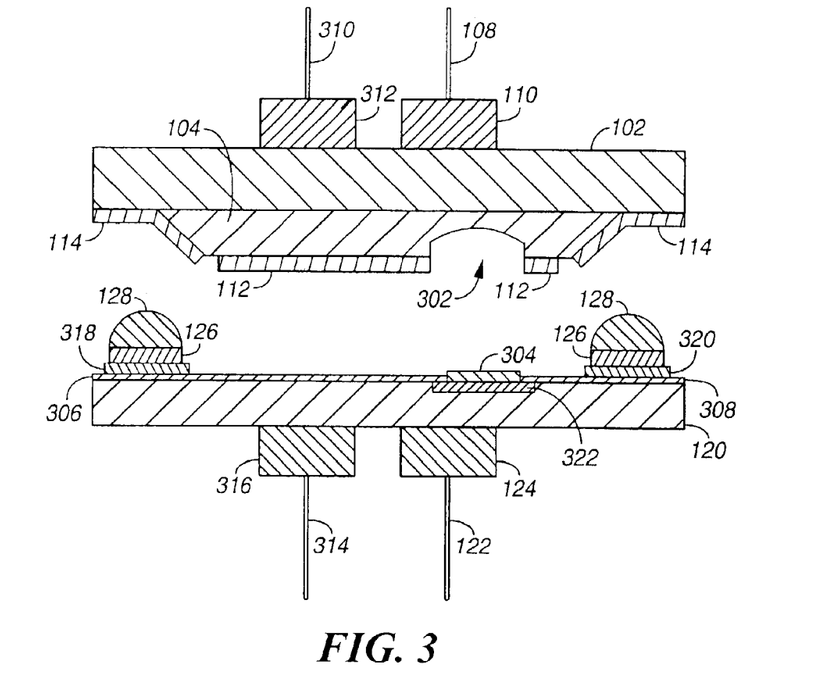
FIG. 3 shows a further sectional view of a polymeric liquid metal switch in accordance with certain embodiments of the present invention.

FIG. 3 shows a further sectional view of a polymeric switch of the present invention. The polymer layer 104 in the upper part contains a heater cavity 302. A heater 304, such as a resistor, is positioned on the inner surface of the transparent switch substrate 120 and is aligned with the heater cavity 302. When the two parts are assembled, the heater is inside the heater cavity. Electrical conductors 306 and 308 provide electrical connections to the heater. In operation, a voltage is applied across the heater and the gas in the heater cavity is heated, causing an increase in pressure and volume of the gas. Optionally, a second optical fiber 310 is coupled to the transparent channel support plate 102 via optical connector 312. A corresponding optical fiber 314 is coupled to the transparent switch substrate 120 via optical connector 316, so that optical fibers 310 and 314 are optically aligned. Insulation layers 318 and 320 provide electrical insulation between the electrical conductors 306 and 308 and the solder ring 126. The layers may be, for example, spin-on glass, or a thin film passivation layer such as SiNx or SiO2. The layer is preferably thin enough that it does not impede the creation of the solder joint between the solder rings. A polymer layer 322 (such as a polyimide layer) separates the heater 304 from the transparent switch substrate 120.

Figure 4:
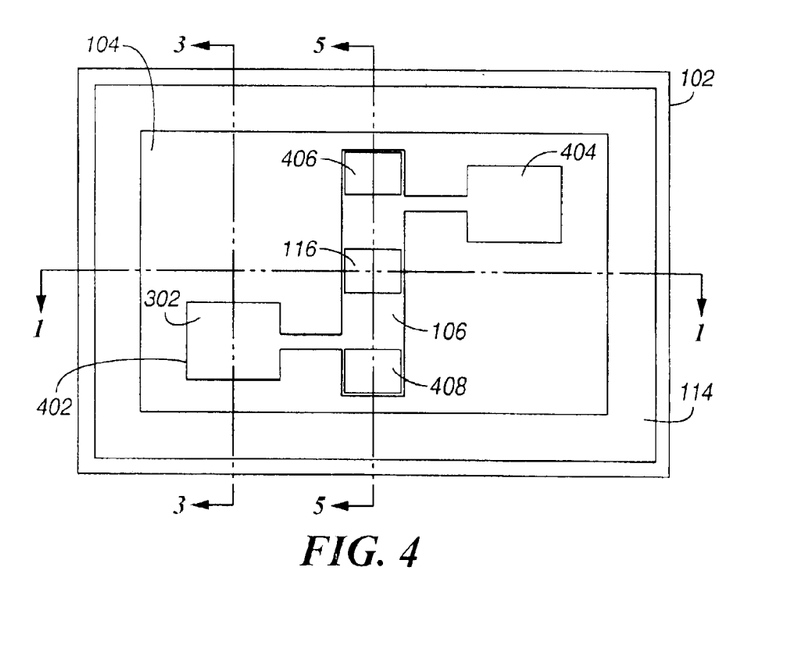
FIG. 4 is a view of the inner surface of a channel support plate in accordance with certain embodiments of the present invention.

FIG. 4 is a view of the under side of the transparent channel support plate 102. The upper solder ring 114 is attached to the perimeter of the inner surface of the transparent channel support plate 102. A channel 402 is contained in the polymer layer 104. The adhesive 112 is not shown in this view. Within the channel are heater cavities, 302 and 404, and switching channel 106. Within the switching channel 106 are three contact pads 406, 116 and 408. The surfaces of the contact pads are wettable by liquid metal. The section 1—1 is shown as the upper part in FIG. 1. The section 3—3 is shown rotated 90° as the upper part in FIG. 3. The section 5—5 is shown rotated 90° as the upper part in FIG. 5.

Figure 5:
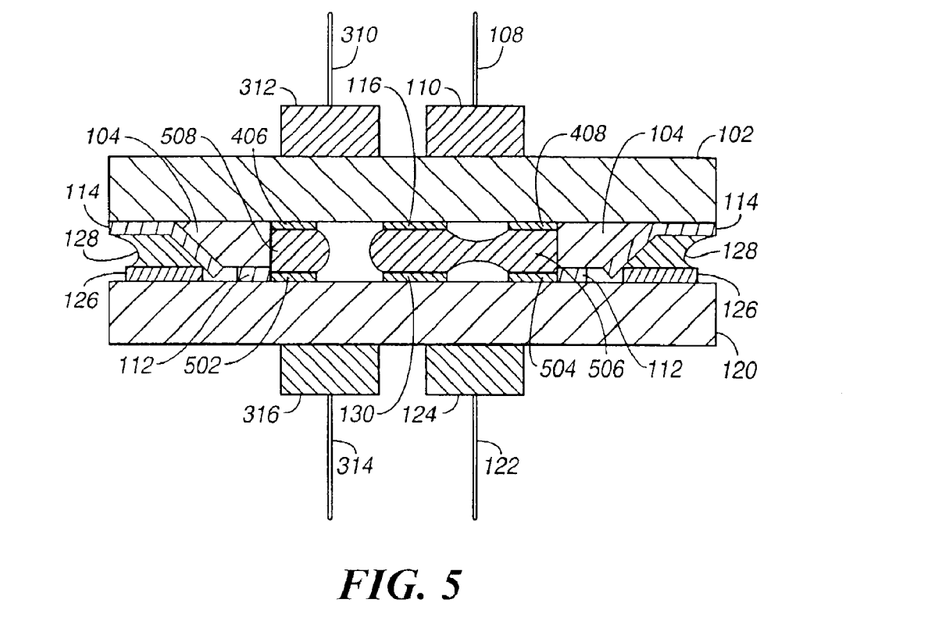
FIG. 5 is a sectional view of an assembled polymeric optical switch in a first switch state.
Figure 6:
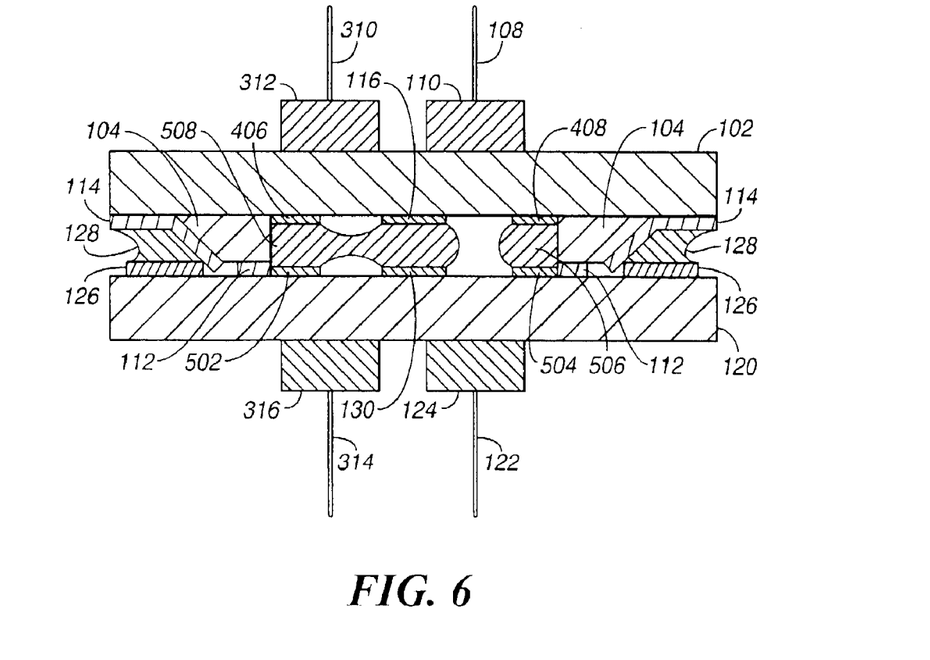
FIG. 6 is a sectional view of an assembled polymeric optical switch in a second switch state.

FIG. 5 is a sectional view of an assembled polymeric optical switch through the section 5—5 in FIG. 4. The view has been rotated 90°. The figure shows a longitudinal section through the switching channel 106. Within the switching channel 106 are upper contact pads 406, 116 and 408, and lower contact pads 502, 130 and 504. The upper and lower contacts may be coupled to form contact rings. Also contained in the switching channel is a volume of liquid metal, shown as two liquid metal volumes 506 and 508. The liquid metal volumes are held in contact with the contact pads by the surface tension of the liquid metal. The wettable contact pads and the surface tension of the liquid metal provide a latching mechanism for the switch. With the liquid metal distributed as shown in FIG. 5, the optical path between the optical fibers 108 and 122 is blocked by the liquid metal, while the path between optical fibers 310 and 314 is open. When a voltage is applied to the heater (304 in FIG. 3), the pressure in the heater cavity (302 in FIG. 3) is increased. The heater cavity is coupled to the switching cavity, and the pressure in the right hand end of the switching cavity in FIG. 5 is also increased. The increased pressure overcomes the surface tension and breaks the liquid metal bond between the contact pads 408 and 504 and the contact pads 116 and 130. Some of the liquid metal is moved along the switching channel and coalesces with the liquid metal volume 508. In this manner, the optical path is opened between the optical fibers 108 and 122, while the liquid metal blocks the path between optical fibers 310 and 314. The resulting switched state is shown in FIG. 6. When a voltage is applied to a corresponding heater in heater cavity 404 (shown in FIG. 4), the switch-state is reversed.

Figure 7:
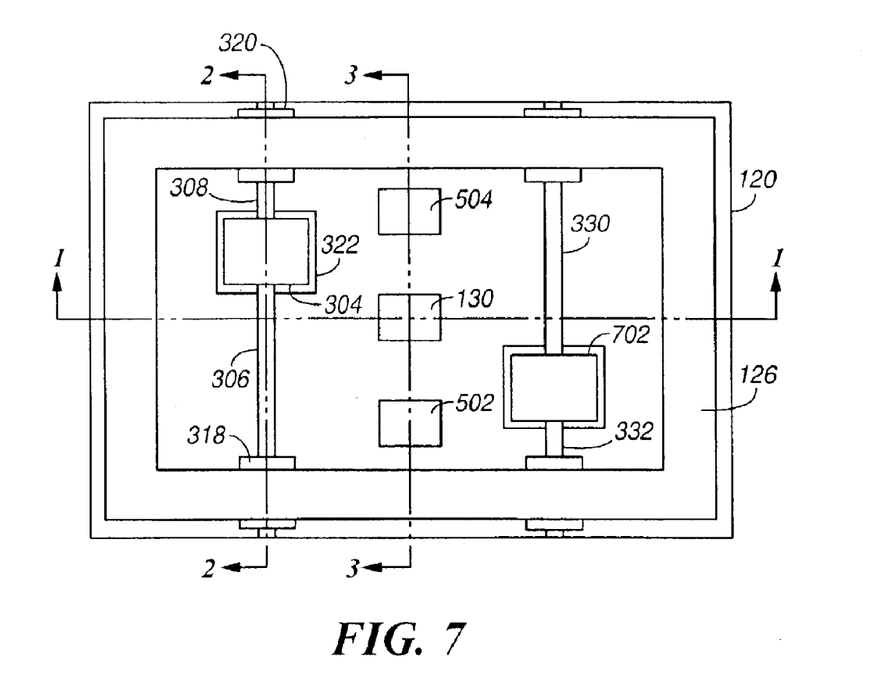
FIG. 7 is a view of the inner surface of a switch substrate in accordance with certain embodiments of the present invention.

FIG. 7 is a view of the inner surface of the lower part of the switch, i.e. the upper surface of the transparent switch substrate 120. The lower solder ring 126 covers the perimeter of the transparent switch substrate 120. The solder itself is not shown in this view. Heater 304 is positioned on the substrate so as to align with the heater cavity 302 (shown in FIG. 3 and FIG. 4) when the switch is assembled. Heater 702 is positioned on the substrate so as to align with the heater cavity 404 (shown in FIG. 4) when the switch is assembled. Electrical connections 306 and 308 extend from the heater 304 to the edges of the substrate, so that an electrical voltage can be applied to the heater 322. Electrical connections 308 and 306 extend from the heater 304 to the edges of the substrate, so that an electrical voltage can be applied to the heater 304. Alternatively, the electrical conductors could be passed through vias in the switch substrate. Insulation layers 318 and 320 isolate the electrical connections from the solder ring 126. A polymer layer 322 separates the heater 304 from the transparent switch substrate 120. Corresponding connections and insulation layers are used to connect the second heater 702 to the edge of the substrate. Contact pads 502, 130 and 504 have a surface that is wettable by the liquid metal in the switching chamber. The section 1—1 is shown as the lower part in FIG. 1. The section 3—3 (rotated 90°) is shown as the lower part in FIG. 3. The section 5—5 is shown (rotated 90°) as the lower part in FIG. 5.

Figure 8:
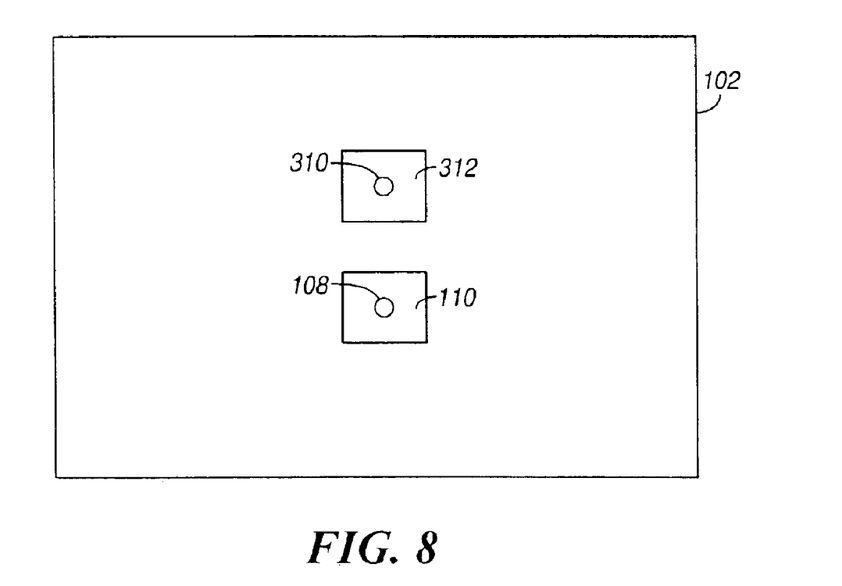
FIG. 8 is a view of the outer surface of a channel support plate in accordance with certain embodiments of the present invention.

FIG. 8 is a view of the outer surface of the transparent channel support plate 102. Attached to the plate are optical connectors 312 and 110, which couple optical fibers 310 and 108 to the plate.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A polymeric optical switch, comprising:
    a polymer layer;
    a switching channel formed in the polymer layer;
    a switch substrate having an inner surface and an outer surface, the inner surface being attached to the polymer layer;
    a liquid metal switch formed on the inner surface of the switch substrate and contained within the switching channel; and
    a first optical path passing through the switching channel.

2. A polymeric optical switch in accordance with claim 1, further comprising a layer of adhesive between the switch substrate and the polymer layer.

3. A polymeric optical switch in accordance with claim 1, further comprising a channel support plate having an inner surface and an outer surface, the inner surface of the channel support plate being attached to the polymer layer so that the polymer layer lies between the channel support plate and the switch substrate.

4. A polymeric optical switch in accordance with claim 3, wherein the channel support plate and the switch substrate are transparent.

5. A polymeric optical switch in accordance with claim 4, wherein at least one of the channel support plate and the switch substrate is glass.

6. A polymeric optical switch in accordance with claim 4, wherein at least one of the channel support plate and the switch substrate is quartz.

7. A polymeric optical switch in accordance with claim 4, further comprising:
    a first optical connector coupled to the outer surface of the channel support plate; and
    a second optical connector coupled to the outer surface of the switch substrate, the second optical connector being optically aligned with the first optical connector to form a first optical path through the switching channel.

8. A polymeric optical switch in accordance with claim 3, further comprising an hermetic seal between the channel support plate and the switch substrate, the hermetic seal, the channel support plate and the switch substrate enclosing the polymer layer.

9. A polymeric optical switch in accordance with claim 8, wherein the hermetic seal comprises:
    a first solder ring attached to the perimeter of the inner surface of the channel support plate and surrounding the polymer layer;
    a second solder ring attached to the perimeter of the inner surface of the switch substrate; and
    a solder joint connecting the first and second solder rings.

10. A polymeric optical switch in accordance with claim 9, wherein the first and second solder rings are wettable by molten solder.

11. A polymeric optical switch in accordance with claim 1, wherein the liquid metal switch comprises:
    a first outer contact pad located in the switching channel and having a surface wettable by a liquid metal;
    a second outer contact pad located in the switching channel and having a surface wettable by a liquid metal;
    a middle contact pad located in the switching channel between the first and second outer contact pads and having a surface wettable by a liquid metal;
    a first liquid metal volume contained within the switching cavity and in wetted contact with the first outer contact pad;
    a second liquid metal volume contained within the switching cavity and in wetted contact with the second outer contact pad; and
    a third liquid metal volume contained within the switching cavity and in wetted contact with the middle contact pad;
    wherein the third liquid metal volume is adapted to coalesce with one of the first liquid metal volume and the second liquid metal volume.

12. A polymeric optical switch in accordance with claim 11, wherein the first optical path lies between the first and third liquid metal volumes and is broken when the first and third liquid metal volumes coalesce.

13. A polymeric optical switch in accordance with claim 12, wherein the liquid metal switch further comprises:
    a first heater cavity formed in the polymer layer and coupled to the switching channel;
    a second heater cavity formed in the polymer layer and coupled to the switching channel;
    a first heater positioned in the first heater cavity and adapted to heat a fluid in the first cavity; and a second heater positioned in the second heater cavity and adapted to heat a fluid in the second cavity;

wherein operation of the first heater causes the third liquid metal volume to coalesce with the first liquid metal volume and operation of the second heater causes third liquid metal volume to coalesce with the second liquid metal volume.

14. A polymeric optical switch in accordance with claim 13, further comprising:

a first electrical connection formed on the inner surface of the switch substrate and electrically connected to the first heater; and a second electrical connection formed on the inner surface of the switch substrate and electrically connected to the second heater.

15. A polymeric optical switch in accordance with claim 13, wherein at least one of the first heater and the second heater is separated from the switch substrate by a pad having a low thermal conductivity.

16. A polymeric optical switch in accordance with claim 13, wherein the pad having a low thermal conductivity is made of a polymer material.

17. A polymeric optical switch in accordance with claim 11, further comprising a second optical path passing through the switching channel between the second and third liquid metal volumes, the second optical path being broken when the second and third liquid metal volumes coalesce.

18. A polymeric optical switch in accordance with claim 11, wherein the first and second outer contact pads and the middle contact pad are fixed to the inner surface of the switch substrate.

19. A polymeric optical switch in accordance with claim 11, further comprising a channel support plate having an inner surface and an outer surface.

20. A polymeric optical switch in accordance with claim 19, wherein the first and second outer contact pads and the middle contact pad are fixed to the inner surface of the channel support plate.

21. A polymeric optical switch in accordance with claim 19, wherein at least one of the first outer contact pad, the second outer contact pad and the middle contact pad comprises a pair of contact pads, one of the pair of contact pads being fixed to the inner surface of the channel support plate and the other being fixed to the inner surface of the switch substrate.

22. A polymeric optical switch in accordance with claim 19, wherein at least one of the first outer contact pad, the second outer contact pad and the middle contact pad comprises a contact ring attached to the walls of the switching channel.

23. A polymeric optical switch in accordance with claim 1, wherein the polymer layer is composed of polyimide.

24. A polymeric optical switch in accordance with claim 1, wherein the polymer layer is composed of Kapton.

25. A polymeric optical switch in accordance with claim 1, wherein the switch substrate is composed of a polymer.

26. A polymeric optical switch in accordance with claim 1, produced by a method of micro-machining.

27. A method for manufacturing a polymeric optical switch, the method comprising:

forming a plurality of contact pads on a switch substrate;

forming a heater on the switch substrate;

forming a channel structure in a layer of polymer, the channel structure having a switching channel and a heater cavity coupled to the switching channel;

placing a volume of liquid metal on at least one of the plurality of contact pads; and attaching the switch substrate to the polymer layer, such that the heater is in the heater cavity and the plurality of contact pads are in the switching cavity.

28. A method in accordance with claim 27, wherein the channel structure in the layer of polymer is formed by micro-machining.

29. A method in accordance with claim 28, wherein the channel structure in a layer of polymer is formed by laser ablation of the layer of polymer.

30. A method in accordance with claim 27, wherein the polymer layer is formed on a channel support plate.

31. A method in accordance with claim 30, further comprising:

attaching a first solder ring to the perimeter of the inner surface of the channel support plate, the first solder ring being wettable by molten solder;

attaching a second solder ring to the perimeter of the inner surface of a switch substrate, the second solder ring being wettable by molten solder; and soldering the first solder ring to the second solder ring to form a seal around the polymer layer.

32. A method in accordance with claim 30, wherein forming the channel structure in the layer of polymer comprises:

coating the channel support plate with a liquid polymer;

curing the liquid polymer; and ablating the polymer using a laser to form the channel structure.

33. A method in accordance with claim 27, wherein forming the channel structure in the layer of polymer comprises:

covering a surface of the channel support plate with a polymer; and forming the channel structure by photo-imaging.

34. A method in accordance with claim 27, wherein the attaching the switch substrate to the polymer layer comprises:

applying a layer a adhesive to at least one of the polymer layer and the switch substrate; and bringing the polymer layer and the switch substrate into contact.

* * * * *